(12) United States Patent
Liu et al.

(10) Patent No.: US 11,337,211 B2
(45) Date of Patent: *May 17, 2022

(54) OPERATION REQUEST GENERATING METHOD, DEVICE, AND SYSTEM

(71) Applicant: Huawei Technologies Co., Ltd., Shenzhen (CN)

(72) Inventors: Shucheng Liu, Dongguan (CN); Min Zha, Shenzhen (CN); Qian Zhou, Shenzhen (CN); Xushan Lu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

This patent is subject to a terminal disclaimer.

(21) Appl. No.: 16/601,980

(22) Filed: Oct. 15, 2019

(65) Prior Publication Data

US 2020/0120653 A1    Apr. 16, 2020

Related U.S. Application Data

(63) Continuation of application No. 14/951,335, filed on Nov. 24, 2015, now Pat. No. 10,484,987, which is a (Continued)

(30) Foreign Application Priority Data

May 27, 2013 (CN) .......................... 201310201914.X

(51) Int. Cl.
*H04W 72/04* (2009.01)
*H04L 12/64* (2006.01)
*H04L 69/22* (2022.01)

(52) U.S. Cl.
CPC ....... *H04W 72/044* (2013.01); *H04L 12/6418* (2013.01); *H04L 69/22* (2013.01)

(58) Field of Classification Search
CPC ... H04W 72/044; H04L 12/6418; H04L 69/22
See application file for complete search history.

(56) References Cited

U.S. PATENT DOCUMENTS 6,141,453 A    10/2000  Banham et al.
9,276,851 B1 *  3/2016  Dror .................... H04L 45/745
(Continued)

FOREIGN PATENT DOCUMENTS

CN    1822569 A    8/2006
CN    102104541 A   6/2011
CN    102780619 A   11/2012

*Primary Examiner* — Syed Ali
(74) *Attorney, Agent, or Firm* — Slater Matsil, LLP

(57) ABSTRACT

An operation request generating method, including a generation device generates a first operation request that requests to perform an operation on a first packet, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header, and the generation device sends the first operation request to a description device or a receiving device.

17 Claims, 5 Drawing Sheets

Related U.S. Application Data continuation of application No. PCT/CN2014/078082, filed on May 22, 2014.

(56) References Cited

U.S. PATENT DOCUMENTS

| | | | |
|---|---|---|---|
| 9,497,455 B2* | 11/2016 | Yamazaki | H04N 19/96 |
| 2003/0149886 A1 | 8/2003 | Ito et al. | |
| 2006/0182127 A1 | 8/2006 | Park | |
| 2008/0310630 A1 | 12/2008 | Candelore | |
| 2009/0271832 A1* | 10/2009 | Park | H04N 21/6405 |
| | | | 725/98 |
| 2009/0304361 A1* | 12/2009 | Chan | H04N 21/4305 |
| | | | 386/357 |
| 2010/0011088 A1 | 1/2010 | Gautier et al. | |
| 2010/0095064 A1 | 4/2010 | Aviles | |
| 2010/0215057 A1 | 8/2010 | Frink et al. | |
| 2011/0129199 A1 | 6/2011 | Del Sordo et al. | |
| 2011/0208829 A1* | 8/2011 | Kwon | H04N 21/23439 |
| | | | 709/217 |
| 2013/0094507 A1 | 4/2013 | Brebner | |
| 2013/0262538 A1* | 10/2013 | Wegener | H03M 7/30 |
| | | | 708/203 |
| 2013/0262809 A1* | 10/2013 | Wegener | H03M 7/24 |
| | | | 711/165 |
| 2014/0006908 A1* | 1/2014 | Gruber | H03M 13/09 |
| | | | 714/776 |
| 2014/0198789 A1* | 7/2014 | Kim | H03M 7/3091 |
| | | | 370/392 |
| 2014/0233571 A1 | 8/2014 | Pope et al. | |
| 2016/0142757 A1 | 5/2016 | Toma et al. | |

\* cited by examiner

OPERATION REQUEST GENERATING METHOD, DEVICE, AND SYSTEM

CROSS-REFERENCE TO RELATED APPLICATIONS

This application is a continuation of U.S. patent application Ser. No. 14/951,335, filed on Nov. 24, 2015, which is a continuation of International Application No. PCT/CN2014/078082, filed on May 22, 2014. The International Application claims priority to Chinese Patent Application No. 201310201914.X, filed on May 27, 2013. All of the aforementioned patent applications are hereby incorporated by reference in their entireties.

TECHNICAL FIELD

The present invention relates to communications technologies, and in particular, to an operation request generating method, a device, and a system.

BACKGROUND

As communications technologies develop, there are some interim technologies or protocols between some protocols and next-generation protocols, for example, an interim technology between Internet Protocol version 4 (IPv4) and a next-generation Internet Protocol (IPv6). Existing interim technologies are applied in various scenarios, and optimized solutions constantly emerge.

The inventor finds that when dealing with these interim technologies and problems that the interim technologies are applied in many scenarios and that optimized solutions constantly emerge, an existing device needs to use data models and entries of different structures to support different technologies or protocols, that is, establish corresponding data models or entries according to different technologies or protocols. Sometimes even in a same technology or protocol, different data models or entries also need to be established to support different application scenarios. In this way, when receiving information such as parameters sent by using different protocols, the device can identify and execute indicated commands. Therefore, product development and maintenance based on an existing device architecture are difficult. For example, when device A sends, to device B, an operation request that requests device B to perform an operation on to-be-processed packets that arrive at device B, because the to-be-processed packets may belong to different protocols or need to be processed by using different mechanisms, device A, that is, a device sending the operation request, needs to have a capability of sending multiple types of operation requests to support different protocols. As a result, deployment of device A is relatively complex.

SUMMARY

Embodiments of the present invention provide an operation request generating method, a device, and a system, which are used to reduce a requirement on a device that sends an operation request, and reduce difficulty in deploying the device that sends an operation request.

A first aspect provides an operation request generating method, where the method includes generating, by a generation device, a first operation request that requests to perform an operation on a first packet, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header, and sending, by the generation device, the first operation request to a description device or a receiving device.

A second aspect provides an operation request generating method, where the method includes receiving, by a description device, a first operation request that requests to perform an operation on a first packet, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header, and performing, by the description device, protocol description on the first operation request by using a first description language recognizable to a receiving device, to generate a second operation request, and sending the second operation request to the receiving device.

According to the second aspect, in a first implementation manner of the second aspect, the receiving device is a conversion device or a data processing device.

A third aspect provides an operation request generating method, where the method includes generating, by a generation device, a first operation request that requests to perform an operation on a first packet, where the first operation request is described in a first description language recognizable to a receiving device, and sending the first operation request to the receiving device, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header.

According to the third aspect, in a first implementation manner of the third aspect, the receiving device is a conversion device or a data processing device.

A fourth aspect provides a packet processing method, where the method includes receiving, by a receiving device, a first operation request that requests to perform an operation on a first packet, where the first operation request includes first assignment content and information used to indicate a first assignment location, the first assignment location is a location in the first packet, and the first assignment content is data used to assign a value to the first assignment location, and determining, by the receiving device according to the information used to indicate the first assignment location, an identifier of a first field corresponding to the first assignment location, where the first field is a field in the first packet, and the information used to indicate the first assignment location includes an identifier of a type of a first packet header, a first offset, and a first length, where the first packet header is a packet header in the first packet, and the first offset is an offset relative to a start location of the first packet header.

According to the fourth aspect, in a first implementation manner of the fourth aspect, the determining, according to the information used to indicate the first assignment location, an identifier of a first field corresponding to the first assignment location includes determining the type of the first packet header according to the identifier of the type of the first packet header, and determining the identifier of the first field according to a format of the first packet header, the first offset, and the first length, where the first field is a field in the first packet header, and the format of the first packet header is determined according to the type of the first packet header.

According to the fourth aspect, in a second implementation manner of the fourth aspect, the determining, according to the information used to indicate the first assignment location, an identifier of a first field corresponding to the first assignment location includes determining the type of the first packet header according to the identifier of the type of the first packet header, and determining the identifier of the first field according to the type of the first packet header, a format of the first packet, the first offset, and the first length.

According to the fourth aspect, the first implementation manner of the fourth aspect, or the second implementation manner of the fourth aspect, in a third implementation manner of the fourth aspect, the receiving device is a conversion device, and the method further includes generating, by the conversion device, a third operation request according to the identifier of the first field and the first assignment content, and sending the third operation request to a data processing device, where the third operation request is used to request the data processing device to after the first packet is received, determine the first field in the first packet according to the identifier of the first field, and assign a value to the first field according to the first assignment content.

According to the fourth aspect, the first implementation manner of the fourth aspect, the second implementation manner of the fourth aspect, or the third implementation manner of the fourth aspect, in a fourth implementation manner of the fourth aspect, the receiving device is a data processing device, and the method further includes receiving, by the data processing device, the first packet, and assigning, by the data processing device, a value to the first field according to the first assignment content and the identifier of the first field.

According to the fourth aspect, the first implementation manner of the fourth aspect, the second implementation manner of the fourth aspect, the third implementation manner of the fourth aspect, or the fourth implementation manner of the fourth aspect, in a fifth implementation manner of the fourth aspect, the identifier of the first field is a name of the first field.

According to the fourth aspect, the first implementation manner of the fourth aspect, the second implementation manner of the fourth aspect, the third implementation manner of the fourth aspect, the fourth implementation manner of the fourth aspect, or the fifth implementation manner of the fourth aspect, in a sixth implementation manner of the fourth aspect, the first operation request is described in a first description language recognizable to the receiving device.

A fifth aspect provides a generation device, including a generation module, configured to generate a first operation request that requests to perform an operation on a first packet, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header, and a sending module, configured to send the first operation request to a description device or a receiving device.

A sixth aspect provides a description device, including a receiving module, configured to receive a first operation request that requests to perform an operation on a first packet, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header, and a description module, configured to perform protocol description on the first operation request by using a first description language recognizable to a receiving device, to generate a second operation request, and send the second operation request to the receiving device.

According to the sixth aspect, in a first implementation manner of the sixth aspect, the receiving device is a conversion device or a data processing device.

A seventh aspect provides a generation device, including a generation module, configured to generate a first operation request that requests to perform an operation on a first packet, where the first operation request is described in a first description language recognizable to a receiving device, and a sending module, configured to send the first operation request to the receiving device, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header.

According to the seventh aspect, in a first implementation manner of the seventh aspect, the receiving device is a conversion device or a data processing device.

An eighth aspect provides a receiving device, including a receiving module, configured to receive a first operation request that requests to perform an operation on a first packet, where the first operation request includes first assignment content and information used to indicate a first assignment location, the first assignment location is a location in the first packet, and the first assignment content is data used to assign a value to the first assignment location, and a determining module, configured to determine, according to the information used to indicate the first assignment location, an identifier of a first field corresponding to the first assignment location, where the first field is a field in the first packet, and the information used to indicate the first assignment location includes an identifier of a type of a first packet header, a first offset, and a first length, where the first packet header is a packet header in the first packet, and the first offset is an offset relative to a start location of the first packet header.

According to the eighth aspect, in a first implementation manner of the eighth aspect, the determining module is specifically configured to determine the type of the first packet header according to the identifier of the type of the first packet header, and determine the identifier of the first field according to a format of the first packet header, the first offset, and the first length, where the first field is a field in the first packet header, and the format of the first packet header is determined according to the type of the first packet header.

According to the eighth aspect, in a second implementation manner of the eighth aspect, the determining module is specifically configured to determine the type of the first packet header according to the identifier of the type of the first packet header, and determine the identifier of the first field according to the type of the first packet header, a format of the first packet, the first offset, and the first length.

According to the eighth aspect, the first implementation manner of the eighth aspect, or the second implementation manner of the eighth aspect, in a third implementation manner of the eighth aspect, the receiving device is a conversion device, and the receiving device further includes a conversion module, configured to generate a third operation request according to the identifier of the first field and the first assignment content, where the third operation request is used to request a data processing device to after the first packet is received, determine the first field in the first packet according to the identifier of the first field, and assign a value to the first field according to the first assignment content, and a sending module, configured to send the third operation request to the data processing device.

According to the eighth aspect, the first implementation manner of the eighth aspect, or the second implementation manner of the eighth aspect, in a fourth implementation manner of the eighth aspect, the receiving device is a conversion device, the receiving module is further configured to receive the first packet, and the receiving device further includes a processing module, configured to assign a value to the first field according to the first assignment content and the identifier of the first field.

According to the eighth aspect, the first implementation manner of the eighth aspect, the second implementation manner of the eighth aspect, the third implementation manner of the eighth aspect, or the fourth implementation manner of the eighth aspect, in a fifth implementation manner of the eighth aspect, the identifier of the first field is a name of the first field.

According to the eighth aspect, the first implementation manner of the eighth aspect, the second implementation manner of the eighth aspect, the third implementation manner of the eighth aspect, the fourth implementation manner of the eighth aspect, or the fifth implementation manner of the eighth aspect, in a sixth implementation manner of the eighth aspect, the first operation request is described in a first description language recognizable to the receiving device.

A ninth aspect provides an operation request processing system, including the generation device provided in the fifth aspect, the description device provided in the sixth aspect or the first implementation manner of the sixth aspect, and the receiving device provided in any one of the eighth aspect to the sixth implementation manner of the eighth aspect.

A tenth aspect provides an operation request processing system, including the generation device provided in the seventh aspect or the first implementation manner of the seventh aspect, and the receiving device provided in any one of the eighth aspect to the sixth implementation manner of the eighth aspect.

It can be found from content of the embodiments that a first operation request includes an identifier B of a type of a first packet header, a first offset O, and a first length L that are used to indicate a first assignment location, and further includes data that is used to assign a value to the first assignment location and briefly referred to as V. This manner of carrying first assignment content and information used to indicate the first assignment location is referred to as a BOLV mode. Because the manner in which the first operation request carries information does not change as a protocol used as an operation object changes, it may be considered that the first operation request is a generic operation request independent of a protocol. This generic operation request can help a network system reduce types of required operation requests, and reduce difficulty in deploying a generation device, thereby reducing system complexity and improving efficiency.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
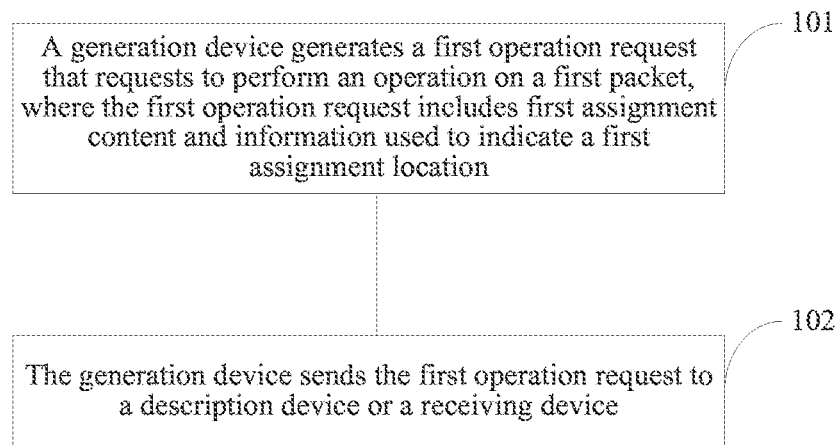
FIG. 1 is a schematic flowchart of a method in Embodiment 1 according to the present invention.

FIG. 1 is a schematic flowchart of a method in Embodiment 1 according to the present invention. As shown in FIG. 1, the method includes the following.

101: A generation device generates a first operation request that requests to perform an operation on a first packet, where the first operation request includes first assignment content and information used to indicate a first assignment location. The first assignment location is a location in the first packet, and the first assignment content is data (Value or V) used to assign a value to the first assignment location, that is, data written into the first assignment location. The information used to indicate the first assignment location includes an identifier of a type of a first packet header, a first offset (O), and a first length (L), where the first packet header is a packet header in the first packet, and the first offset is an offset relative to a start location of the first packet header.

The identifier of the type of the first packet header may be represented by the English letter B, where B means basis, and indicates that the identifier of the type of the first packet header is basic information used to determine the first assignment location. In a specific implementation process, content of the identifier may be predefined, that is, a mapping relationship between the identifier and the type of the packet header is predefined. The first packet header is a packet header in the first packet.

In this embodiment, the type of the packet header should be understood in the following manner.

If a packet header is an outermost packet header of an encapsulated packet, and the packet is classified as an A packet, a type of the packet header is an A type. For example, if the packet is an internet protocol (IP) packet, the type of the packet header is an IP type, if the packet is classified as a Multiprotocol Label Switching (MPLS) packet, the type of the packet header is an MPLS type, and if the packet is classified as a media access control (MAC) packet, the type of the packet header is a MAC type. In this embodiment, the type of the first packet header may be an IP type, an MPLS type or a MAC type, or may be another type. When the type of the first packet header is an IP type, the first packet header is an IP packet header, when the type of the first packet header is an MPLS type, the first packet header is an MPLS packet header, and when the type of the first packet header is a MAC type, the first packet header is a MAC packet header.

The first packet may have multiple packet headers, and the first packet header may be an outermost packet header of the first packet, or may be a packet header in the multiple packet headers except the outermost packet header.

In addition, in a case in which an offset is relative to a determinate non-start location in the first packet header, because the non-start location is determinate, a distance between the non-start location and a start location is determinate. In this way, the offset should be understood as an offset actually relative to the start location in the first packet header.

The following example is used to describe the first assignment content and the information used to indicate the first assignment location that are in the first operation request more clearly.

It is assumed that in the first operation request, the identifier B of the type of the first packet header is b1, the first offset O is 20 bits, the first length L is 10 bits, and the first assignment content V is aaaa. In this case, the first operation request is used to request to assign a value to the $21^{st}$ to $30^{th}$ bits in the first packet header whose type is b1, and assigned content is aaaa.

Optionally, the generation device may be an application-layer device, for example, a network management device, and sends some parameters by using a protocol, so that a data processing device that receives these parameters may perform some operations according to content of the parameters. The first operation request is generated in S101, that is, these parameters required to perform an operation on the first packet are represented by using a generic first data model, to generate the first operation request generic for a data section.

102: The generation device sends the first operation request to a description device or a receiving device, so that the description device or the receiving device performs further processing.

It can be found from content in this embodiment that a first operation request includes an identifier B of a type of a first packet header, a first offset O, and a first length L that are used to indicate a first assignment location, and further includes data that is used to assign a value to the first assignment location and briefly referred to as V. This manner of carrying first assignment content and information used to indicate the first assignment location is referred to as a BOLV mode. Because the manner in which the first operation request carries information does not change as a protocol used as an operation object changes, it may be considered that the first operation request is a generic operation request independent of a protocol. This generic operation request can help a network system reduce types of required operation requests, and reduce difficulty in deploying a generation device, thereby reducing system complexity and improving efficiency. This method can further enable an entire system to support multiple types of requests more easily.

In addition, it should be further noted that protocol description may be performed on a first operation request by a description device before the first operation request is sent to a receiving device. The first operation request on which protocol description is not performed may also be sent to the receiving device, because the receiving device may have a capability of recognizing an operation request that is not described by the description device.

Figure 2:
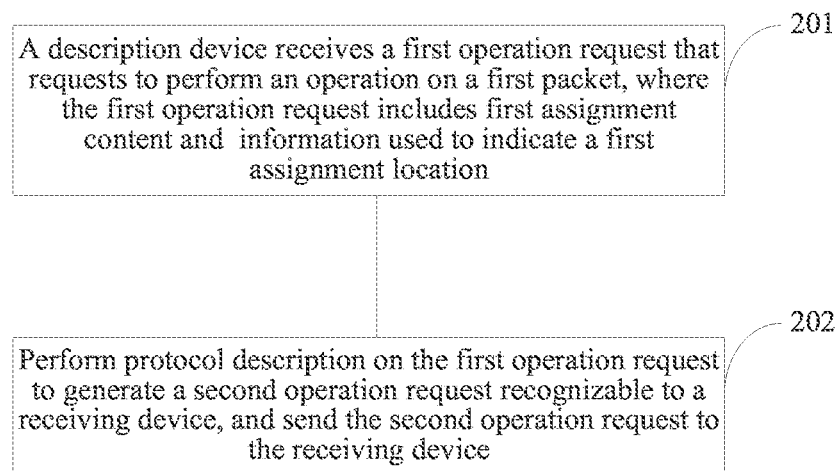
FIG. 2 is a schematic flowchart of a method in Embodiment 2 according to the present invention.

FIG. 2 is a schematic flowchart of a method in Embodiment 2 according to the present invention. The method shown in FIG. 2 may be understood as corresponding to the method embodiment shown in FIG. 1, that is, a description device and a first operation request in Embodiment 2 may be the description device and the first operation request in Embodiment 1. The operation request generating method in Embodiment 2 includes the following content.

201: A description device receives a first operation request that requests to perform an operation on a first packet, that is, receives the first operation request that is for requesting to perform an operation on the first packet and that is sent by the foregoing described generation device. The first operation request includes first assignment content and information used to indicate a first assignment location, the first assignment location is a location in the first packet, and the first assignment content is data used to assign a value to the first assignment location. The information used to indicate the first assignment location includes an identifier of a type of a first packet header, a first offset, and a first length, where the first packet header is a packet header in the first packet, and the first offset is an offset relative to a start location of the first packet header.

202: The description device performs protocol description on the first operation request by using a first description language recognizable to a receiving device, to generate a second operation request, and sends the second operation request to the receiving device. Because the first description language is recognizable to the receiving device, the second operation request obtained through description in the first description language is also recognizable to the receiving device.

Further, the receiving device may be a conversion device or a data processing device. In a general case, the second operation request obtained by the description device through description in a description language can be recognized by a data processing device, and a corresponding operation can be performed according to the second operation request. However, in some cases, some special data processing devices may be unable to recognize an operation request obtained by the description device through description in a description language, therefore, a conversion device such as a protocol adaptive device needs to be added to a network architecture, to adapt the operation request obtained by the description device through description in a description language to a form recognizable to the data processing device, and then the adapted operation request is sent to the data processing device. In this way, the operation request processing method has a wider application range.

It should be noted that the conversion device can support multiple forwarding planes. Specifically, the second operation request may be translated, in BOLV mode described in Embodiment 1, into a third operation request recognizable to the data processing device, and in this way, after receiving the third operation request, the data processing device can recognize an operation to be performed.

In this embodiment, a description device receives a first operation request that requests to perform an operation on a first packet, performs protocol description on the first operation request by using a first description language, to obtain the second operation request, and sends the generated second operation request to a receiving device. Optionally, the receiving device may be a conversion device or a data processing device.

For example, assuming that the first description language is of a YANG model, that is, a modeling language YANG in a network configuration (netconf) protocol, in this case, the performing protocol description on the first operation request by using a first description language, to generate a second operation request is specifically encapsulating the first operation request by using the YANG model, to generate the second operation request. More specifically, the YANG model is similar to a tree-like structure, and is formed by a root, branches at various levels, and leaves. Herein, content of the first operation request is correspondingly filled into the branches at various levels and the leaves of the YANG model, to obtain the second operation request.

Because the first description language is recognizable to the receiving device, the receiving device can recognize content of the second operation request and understand an overall meaning of the second operation request, to subsequently process the first packet according to the second operation request.

Figure 3:
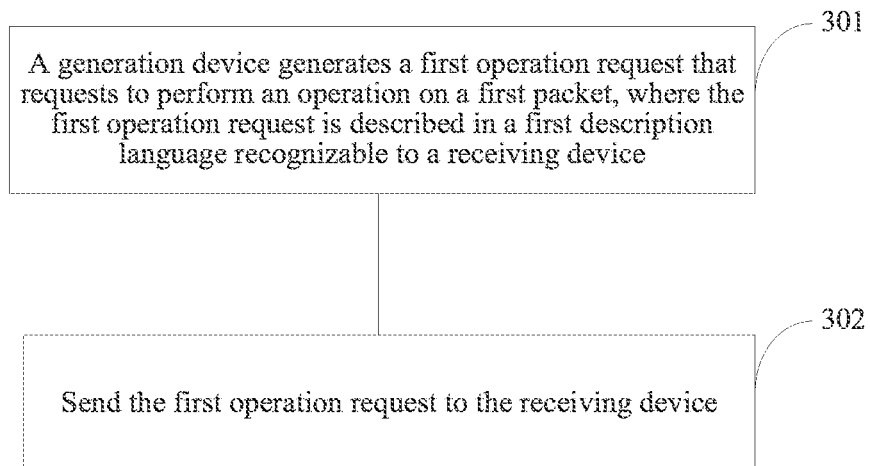
FIG. 3 is a schematic flowchart of a method in Embodiment 3 according to the present invention.

FIG. 3 is a schematic flowchart of a method in Embodiment 3 according to the present invention. As shown in FIG. 3, the method includes the following.

301: A generation device generates a first operation request that requests to perform an operation on a first packet, where the first operation request is described in a first description language recognizable to a receiving device.

302: Send the first operation request to the receiving device.

The first operation request includes first assignment content and information used to indicate a first assignment location, the first assignment location is a location in the first packet, and the first assignment content is data used to assign a value to the first assignment location. The information used to indicate the first assignment location includes an identifier of a type of a first packet header, a first offset, and a first length. The first packet header is a packet header in the first packet, and the first offset is an offset relative to a start location of the first packet header.

Further, the receiving device may be a conversion device or a data processing device.

The first operation request in this embodiment may be understood as the second operation request in Embodiment 2.

The generation device in this embodiment integrates functions of the generation device in Embodiment 1 and the description device in Embodiment 2, directly generates a first operation request that is described in a first description language and is recognizable to a receiving device, and correspondingly sends the first operation request to the receiving device.

Figure 4:
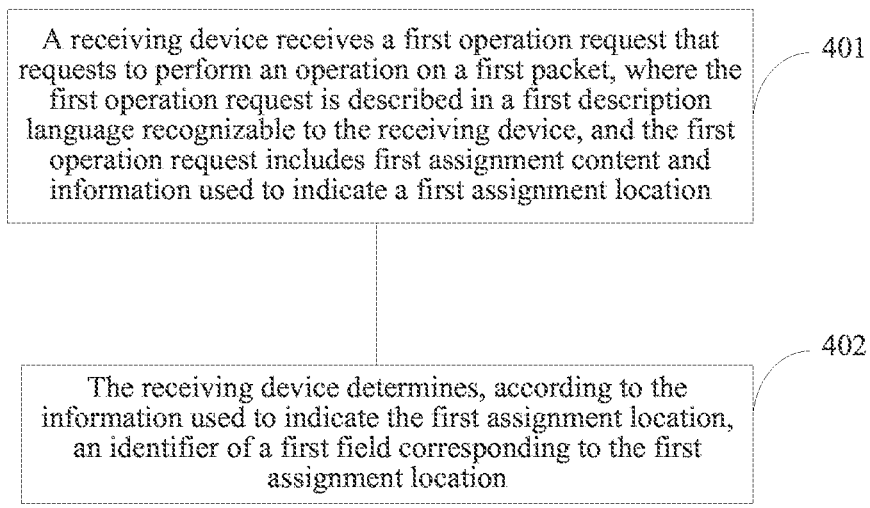
FIG. 4 is a schematic flowchart of a method in Embodiment 4 according to the present invention.

FIG. 4 is a schematic flowchart of a method in Embodiment 4 according to the present invention. The method is executed by a receiving device. As shown in FIG. 4, based on the foregoing method embodiments, the method includes the following content.

401: The receiving device receives a first operation request that requests to perform an operation on a first packet, where the first operation request is described in a first description language recognizable to the receiving device, the first operation request includes first assignment content and information used to indicate a first assignment location, the first assignment location is a location in the first packet, and the first assignment content is data used to assign a value to the first assignment location.

Optionally, the first operation request in this embodiment may be understood as the second operation request in the embodiment corresponding to FIG. 1 or FIG. 2, or may be understood as the first operation request in the embodiment corresponding to FIG. 3.

402: The receiving device determines, according to the information used to indicate the first assignment location, an identifier of a first field corresponding to the first assignment location, where the first field is a field in the first packet. The information used to indicate the first assignment location includes an identifier of a type of a first packet header, a first offset, and a first length, where the first packet header is a packet header in the first packet, and the first offset is an offset relative to a start location of the first packet header.

The identifier of the type of the first packet header may be represented by B, the first offset may be represented by O, the first length may be represented by L, and the first assignment content may be represented by V. This manner of carrying the first assignment content and information used to indicate the first assignment location is referred to as a BOLV mode.

In this embodiment, the type of the packet header should be understood in the following manner.

If a packet header is an outermost packet header of an encapsulated packet, and the packet is classified as an A packet, a type of the packet header is an A type. For example, if the packet is an IP packet, the type of the packet header is an IP type, if the packet is classified as a Multiprotocol Label Switching (MPLS) packet, the type of the packet header is an MPLS type, and if the packet is classified as a MAC packet, the type of the packet header is a MAC type.

In this embodiment, the type of the first packet header may be an IP type, an MPLS type or a MAC type, or may be another type. When the type of the first packet header is an IP type, the first packet header is an IP packet header, when the type of the first packet header is an MPLS type, the first packet header is an MPLS packet header, and when the type of the first packet header is a MAC type, the first packet header is a MAC packet header.

The first packet may have multiple packet headers, and the first packet header may be an outermost packet header of the first packet, or may be a packet header in the multiple packet headers except the outermost packet header.

In addition, in a case in which an offset is relative to a determinate non-start location in the first packet header, because the non-start location is determinate, a distance between the non-start location and a start location is determinate. In this way, the offset should be understood as an offset actually relative to the start location in the first packet header. For example, if a value of an offset from a non-start location B is 10, and a distance between the non-start location B and a start location A is 5, the offset should be understood as an offset relative to the start location A, and a value of the offset is 15.

Optionally, this embodiment of the present invention provides a first specific implementation manner of determining, according to the information used to indicate the first assignment location, the identifier of the first field corresponding to the first assignment location, and the specific implementation manner is applicable to a case in which the first field is a field in the first packet header. The first specific implementation manner includes determining the type of the first packet header according to the identifier of the type of the first packet header, and determining the identifier of the first field according to a format of the first packet header, the first offset, and the first length, where the first field is a field in the first packet header, and the format of the first packet header is determined according to the type of the first packet header.

Because each type of packet header has a fixed format, after the type of the first packet header is determined, the format of the first packet header can be correspondingly determined. A location of the first field in the first packet header can be determined according to the first offset and the first length. The identifier of the first field can be determined according to the location of the first field in the first packet header and the format of the first packet header, that is, which field in the first packet header is the first field is determined.

It is assumed that format information of the first packet header indicates that the packet header includes 40 bits, where the $1^{st}$ to $10^{th}$ bits are a source MAC address field, the $11^{th}$ to $20^{th}$ bits are a destination MAC address field, the $21^{st}$ to $30^{th}$ bits are a source IP address field, and the $31^{st}$ to $40^{th}$ bits are a destination IP address field. If the first offset is 20, and the first length is 10, it can be determined according to the format of the first packet header that the first field corresponding to the first assignment location is the source IP address field. In this embodiment, the identifier of the first field is used to indicate which field in the first packet header is the first field. Optionally, the identifier of the first field is a name of the first field.

Optionally, this embodiment of the present invention further provides a second specific implementation manner of determining, according to the information used to indicate the first assignment location, the identifier of the first field corresponding to the first assignment location.

The second specific implementation manner is not only applicable to a case in which the first field is a field in the first packet header but also applicable to a case in which the first field is a field in another part other than the first packet header in the first packet.

The second specific implementation manner specifically includes determining the type of the first packet header according to the identifier of the type of the first packet header, and determining the identifier of the first field according to the type of the first packet header, a format of the first packet, the first offset, and the first length.

The format of the first packet may be acquired in multiple manners. For example, the first packet may carry format information used to describe the first packet, and the format of the first packet can be obtained by reading the format information, or the format of the first packet may be parsed to obtain the format of the first packet, or an identifier of the first packet is acquired, and a correspondence between the identifier of the first packet and the format of the first packet is queried according to the identifier of the first packet, so as to acquire the format of the first packet.

After the type of the first packet header and the format of the first packet are acquired, the start location of the first packet header can be determined. After the start location is determined, a location of the first field in the first packet can be determined. Further, the identifier of the first field can be determined according to the format of the first packet and the location of the first field in the first packet, that is, that the first field is which field in the first packet is determined.

It is assumed that the first packet includes the first packet header and a second packet header, where lengths of the first packet header and the second packet header are both 40 bits, the first packet header occupies the $1^{st}$ to $40^{th}$ bits of the first packet, and the second packet header occupies the $41^{st}$ to $80^{th}$ bits of the first packet. The first packet header includes 4 fields, which are fields 1-1, 1-2, 1-3, and 1-4, where the field 1-1 occupies the $1^{st}$ to $10^{th}$ bits of the first packet, the field 1-2 occupies the $11^{th}$ to $20^{th}$ bits of the first packet, the field 1-3 occupies the $21^{st}$ to $30^{th}$ bits of the first packet, and the field 1-4 occupies the $31^{st}$ to $40^{th}$ bits of the first packet. Similarly, the second packet header also includes 4 fields, which are fields 2-1, 2-2, 2-3, and 2-4, where the field 2-1 occupies the $41^{st}$ to $50^{th}$ bits of the first packet, the field 2-2 occupies the $51^{st}$ to $60^{th}$ both bits of the first packet, the field 2-3 occupies the $61^{st}$ to $70^{th}$ bits of the first packet, and the field 2-4 occupies the $71^{st}$ to $80^{th}$ bits of the first packet.

When the information used to indicate the first assignment location includes the identifier of the type of the first packet header, the first offset is 50, and the first length is 10, it can be determined that the first assignment location is the $51^{st}$ to $60^{th}$ both bits in the first packet. Therefore, it can be further determined that the first field corresponding to the first assignment location is the field 2-2 in the second packet header. In this way, that the first field is which field in the first packet is determined, that is, the identifier of the first field is determined.

In addition, in a case in which a format of a packet body of the first packet can be determined, the identifier of the first field can still be determined even though the first field is within the packet body.

In this embodiment, the receiving device determines, according to the information about the first assignment location in the first operation request, the identifier of the first field corresponding to the first assignment location, that is, determines that the first field is which field in the first packet, which helps an operation be performed according to an indication of the first operation request. In this way, operation information can be effectively transmitted by using the first operation request. Because the BOLV manner in which the first operation request carries information does not change as a protocol used as an operation object changes, it may be considered that the first operation request is a generic operation request independent of a protocol. This generic operation request can help a network system reduce types of required operation requests, thereby reducing system complexity and improving efficiency. This embodiment helps to use the first operation request on a network and to reduce types of operation requests required in a system.

The method embodiments in the present invention are applied to various network architectures, for example, is applied to a software defined networking (SDN) architecture. The SDN architecture includes an application (APP) device, an SDN functional device, a controller, and an OpenFlow (OF) device. The APP device, that is, an APP device at an upper layer, may generate a first operation request that requests to perform an operation on a first packet, and the SDN functional device describes the first operation request in a first description language, to generate a second operation request, where the APP device and the SDN functional device may be connected to an SDN functional device by using a protocol-generic data model and a programming interface, and then, the second operation request may be directly sent to the OF device. If a conversion device needs to be disposed in some cases, the conversion device may be integrated into the SDN controller, or integrated into the SDN functional device, and the SDN functional device sends the second operation request to the conversion device by using a protocol-generic interface. The protocol-generic data model, the programming interface, and the protocol-generic interface may be all integrated to the SDN functional device, and when the first operation request is generated, the APP device may refer to a data model provided by the protocol-generic data model and the programming interface, for example, a data model of the BOLV mode. In an architecture in which a conversion device is disposed, the adapting the second operation request to a third operation request recognizable to a data processing device is specifically adapting, by using an OF protocol, the second operation request to the third operation request recognizable to the OF device, and may be specifically correspondingly filling a field of the second operation request into a corresponding OF entry, to obtain an operation command that can be run by the OF device, that is, the third operation request. This example is used herein only for the purpose of describing a specific adaptation process, which is not limited to that the OF device must receive an adapted operation request.

For another example, a traditional network includes a network management device and a router. Similar to Embodiment 3 corresponding to FIG. 3, the network management device generates an operation request corresponding to a protocol parameter, and the network management device describes the operation request in a first description language, to generate a first operation request. Certainly, specific tasks may be specifically completed by different functional modules in the network management device. Next, the first operation request is sent to the router, and the router may perform an operation according to the first operation request. That is, in the traditional network, the generation device in Embodiment 3 may be the network management device, and the receiving device may be the router.

Figure 5:
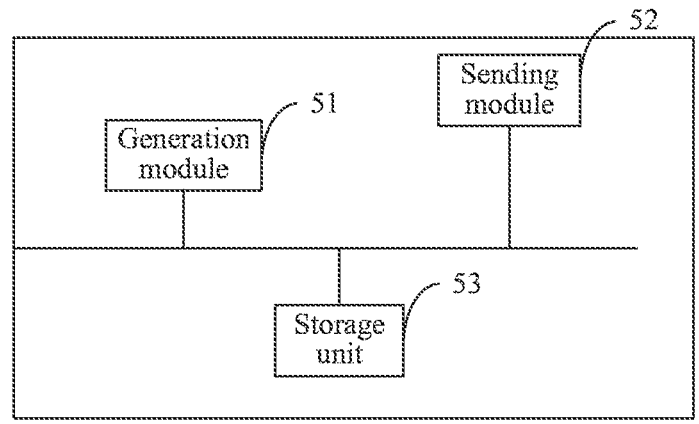
FIG. 5 is a schematic diagram of a generation device in Embodiment 5 according to the present invention.

FIG. 5 is a schematic diagram of a generation device in Embodiment 5 according to the present invention. The generation device shown in FIG. 5 can implement all functions of the generation device in Embodiment 1, therefore, the generation device shown in FIG. 5 may be understood as the generation device in Embodiment 1.

The generation device shown in FIG. 5 includes a generation module 51 and a sending module 52.

The generation module 51 is configured to generate a first operation request that requests to perform an operation on a first packet, where the first operation request includes first assignment content and information used to indicate a first assignment location, where the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header.

The sending module 52 is configured to send the first operation request to a description device or a receiving device.

The generation module 51 may be implemented by a processor, and the sending module 52 may be implemented by a sending port. In addition, the generation device may further include a storage unit 53, where the storage unit 53 stores a computer-readable instruction. After reading the computer-readable instruction, the processor cooperates with the sending port to perform all operations that can be performed by the generation device shown in FIG. 5 or the generation device in Embodiment 1.

Figure 6:
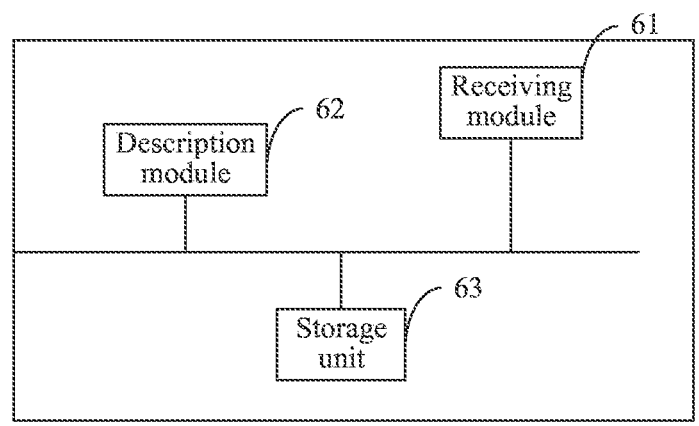
FIG. 6 is a schematic diagram of a description device in Embodiment 6 according to the present invention.

FIG. 6 is a schematic diagram of a description device in Embodiment 6 according to the present invention. The description device shown in FIG. 6 can implement all functions of the description device in Embodiment 2, therefore, it may be understood that the description device shown in FIG. 6 is the description device in Embodiment 2.

The description device shown in FIG. 6 includes a receiving module 61 and a description module 62.

The receiving module 61 is configured to receive a first operation request that requests to perform an operation on a first packet, where the first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header.

The description module 62 is configured to perform protocol description on the first operation request by using a first description language recognizable to a receiving device, to generate a second operation request, and send the second operation request to the receiving device.

In this embodiment, the receiving device may be a conversion device or a data processing device.

The description module 62 may be implemented by a processor, and the receiving module 61 may be implemented by a receiving port. In addition, the description device may further include a storage unit 63, where the storage unit 63 stores a computer-readable instruction. After reading the computer-readable instruction, the processor cooperates with the sending port to perform all operations that can be performed by the generation device shown in FIG. 6 or the description device in Embodiment 2.

Figure 7:
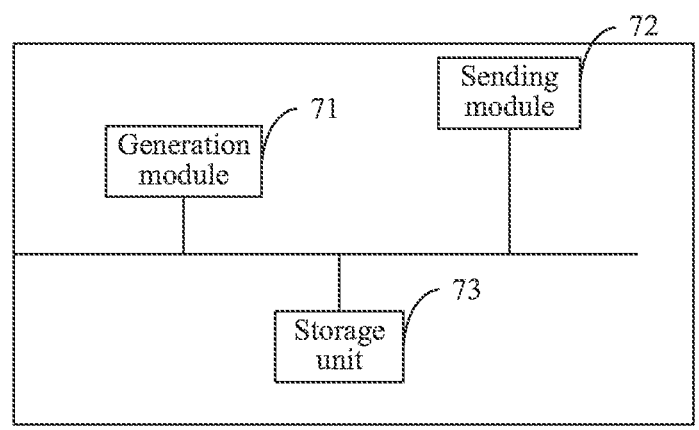
FIG. 7 is a schematic diagram of a generation device in Embodiment 7 according to the present invention.

FIG. 7 is a schematic diagram of a generation device in Embodiment 7 according to the present invention. The generation device shown in FIG. 7 can implement all functions of the generation device in Embodiment 3, therefore, the generation device shown in FIG. 7 may be understood as the generation device in Embodiment 3.

The generation device shown in FIG. 7 includes a generation module 71 and a sending module 72.

The generation module 71 is configured to generate a first operation request that requests to perform an operation on a first packet, where the first operation request is described in a first description language recognizable to a receiving device.

The sending module 72 is configured to send the first operation request to the receiving device.

The first operation request includes first assignment content and information used to indicate a first assignment location, the first assignment location is a location in the first packet, the first assignment content is data used to assign a value to the first assignment location, and the information used to indicate the first assignment location includes an identifier of a type of a first packet header, a first offset, and a first length, where the first packet header is a packet header in the first packet, and the first offset is an offset relative to a start location of the first packet header.

Optionally, the receiving device is a conversion device or a data processing device.

The generation module 71 may be implemented by a processor, and the sending module 72 may be implemented by a sending port. In addition, the generation device may further include a storage unit 73, where the storage unit 73 stores a computer-readable instruction. After reading the computer-readable instruction, the processor cooperates with the sending port to perform all operations that can be performed by the generation device shown in FIG. 7 or the generation device in Embodiment 3.

Figure 8A:
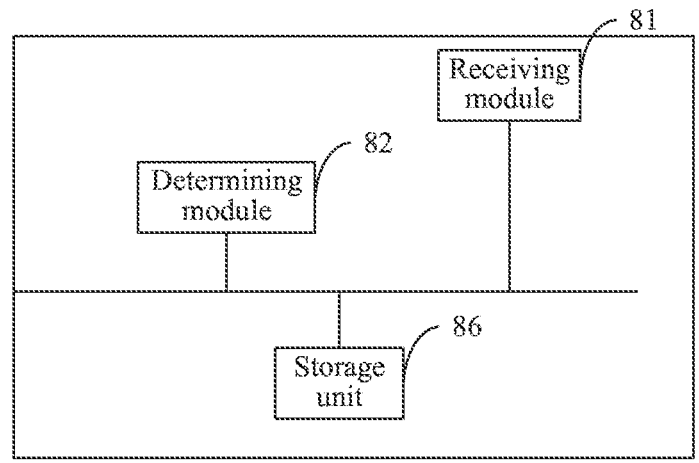
FIG. 8A is a schematic diagram of a receiving device in Embodiment 8 according to the present invention.
Figure 8B:
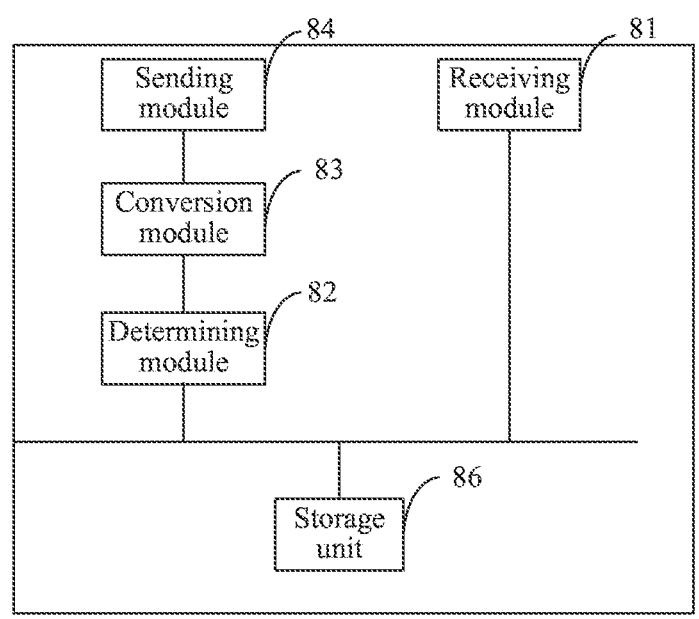
FIG. 8B is a schematic diagram of a receiving device in Embodiment 8 according to the present invention.
Figure 8C:
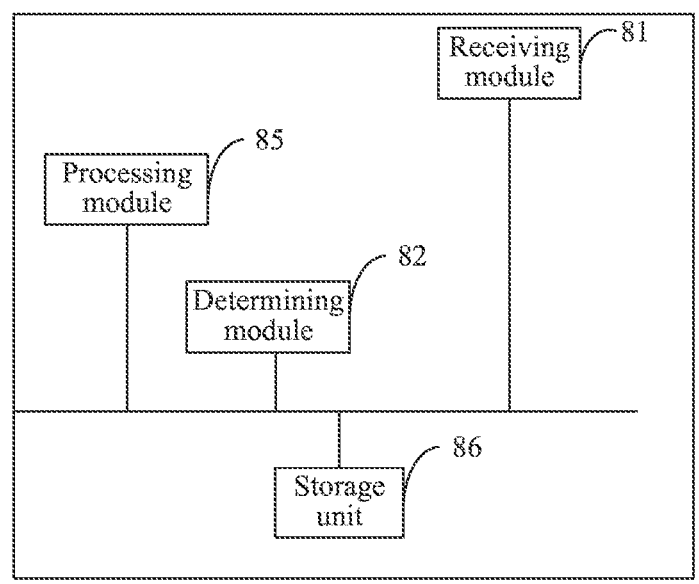
FIG. 8C is a schematic diagram of a receiving device in Embodiment 8 according to the present invention.

FIG. 8A, FIG. 8B or FIG. 8C is a schematic diagram of a receiving device in Embodiment 8 according to the present invention. The receiving device shown in FIG. 8A, FIG. 8B or FIG. 8C can implement all functions of the receiving device in Embodiment 4, therefore, the receiving device shown in FIG. 8A, FIG. 8B or FIG. 8C may be understood as the receiving device in Embodiment 4.

The receiving device shown in FIG. 8A includes a receiving module 81 and a determining module 82.

The receiving module 81 is configured to receive a first operation request that requests to perform an operation on a first packet, where the first operation request includes first assignment content and information used to indicate a first assignment location, the first assignment location is a location in the first packet, and the first assignment content is data used to assign a value to the first assignment location.

The determining module 82 is configured to determine, according to the information used to indicate the first assignment location, an identifier of a first field corresponding to the first assignment location, where the first field is a field in the first packet, and the information used to indicate the first assignment location includes an identifier of a type of a first packet header, a first offset, and a first length, where the first packet header is a packet header in the first packet, and the first offset is an offset relative to a start location of the first packet header.

Optionally, a specific method for determining the identifier of the first field by the determining module 82 includes determining the type of the first packet header according to the identifier of the type of the first packet header, and determining the identifier of the first field according to a format of the first packet header, the first offset, and the first length, where the first field is a field in the first packet header, and the format of the first packet header is determined according to the type of the first packet header.

Optionally, another specific method for determining the identifier of the first field by the determining module 82 includes determining the type of the first packet header according to the identifier of the type of the first packet header, and determining the identifier of the first field according to the type of the first packet header, a format of the first packet, the first offset, and the first length.

The receiving module 81 may be implemented by a receiving port, and the determining module 82 may be implemented by a processor. In addition, the receiving device may further include a storage unit 86, where the storage unit 86 stores a computer-readable instruction. After reading the computer-readable instruction, the processor cooperates with the receiving port and other components to perform all operations that can be performed by the receiving device in Embodiment 4.

Optionally, the receiving device is a conversion device. When the receiving device is a conversion device, the receiving device further includes a conversion module 83, configured to generate a third operation request according to the identifier of the first field and the first assignment content, where the third operation request is used to request a data processing device to, after the first packet is received, determine the first field in the first packet according to the identifier of the first field, and assign a value to the first field according to the first assignment content, and a sending module 84, configured to send the third operation request to the data processing device.

The conversion module 83 may be implemented by the processor used to implement the determining module 82, or may be implemented by another processor.

Optionally, the receiving device is a data processing device. When the receiving device is a data processing device, the receiving module 81 is further configured to receive the first packet. Moreover, the receiving device further includes a processing module 85, configured to assign a value to the first field according to the first assignment content and the identifier of the first field.

The processing module 85 may be implemented by the processor used to implement the determining module 82, or may be implemented by another processor.

Optionally, the identifier of the first field is a name of the first field.

Optionally, the first operation request is described in a first description language recognizable to the receiving device.

In addition, an embodiment of the present invention further provides a network system, where the network system includes the generation device in Embodiment 5, the description device in Embodiment 6, and the receiving device in Embodiment 8, or the network system includes the generation device in Embodiment 7 and the receiving device in Embodiment 8.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

The invention claimed is:

1. An operation request generating method, comprising:
generating, by a generation device, a first operation request, that requests performance of an operation on a first packet, wherein the first operation request comprises first assignment content and information indicating a first assignment location, wherein the first assignment location is a location in the first packet, wherein the first assignment content is data indicating assignment of a value to the first assignment location, wherein the information indicating the first assignment location comprises an identifier of a type of a first packet header, and further comprises a first offset, and a first length, wherein the first packet header is a packet header in the first packet, and wherein the first offset is an offset relative to a start location of the first packet header; and
sending, by the generation device, the first operation request to a description device or a receiving device based on a determination, by the generation device, on whether the receiving device has the capability of recognizing the first operation request that is not described by the description device, wherein the first operation request is a generic operation request independent of a protocol related to a payload of the first packet, and wherein the payload of the first packet is separate from the header of the first packet;
wherein sending the first operation request to the description device causes the description device to perform:
receiving, by the description device, the first operation request;
generating a second operation request by performing, by the description device, protocol description on the first operation request using a first description language recognizable to the receiving device; and
sending the second operation request to the receiving device.

2. The method according to claim 1, wherein the receiving device is a conversion device or a data processing device.

3. An operation request generating method, comprising:
generating, by a generation device, a first operation request, that requests performance of an operation on a first packet, wherein the first operation request is described in a first description language recognizable to a receiving device;
sending the first operation request to the receiving device based on a determination, by the generation device, that the receiving device has the capability of recognizing the first operation request that is not described by a description device;
receiving, by the receiving device, the first operation request; and
determining, by the receiving device, according to information indicating a first assignment location, an identifier of a first field corresponding to the first assignment location, wherein the first field is a field in the first packet;
wherein the first operation request comprises first assignment content and the information indicating the first assignment location, wherein the first assignment location is a location in the first packet, wherein the first assignment content is data indicating assignment of a value to the first assignment location, wherein the information indicating the first assignment location comprises an identifier of a type of a first packet header, a first offset, and a first length, wherein the first packet header is a packet header in the first packet, and wherein the first offset is an offset relative to a start location of the first packet header, wherein the first operation request is a generic operation request independent of a protocol related to a payload of the first packet, and wherein the payload of the first packet is separate from the header of the first packet.

4. The method according to claim 3, wherein the receiving device is a conversion device or a data processing device.

5. The method according to claim 3, wherein the determining the identifier of the first field corresponding to the first assignment location comprises:
determining the type of the first packet header according to the identifier of the type of the first packet header; and
determining the identifier of the first field according to a format of the first packet header, and further according to the first offset, and the first length, wherein the first field is a field in the first packet header, and wherein the format of the first packet header is determined according to the type of the first packet header.

6. The method according to claim 3, wherein the determining the identifier of the first field corresponding to the first assignment location comprises:
determining the type of the first packet header according to the identifier of the type of the first packet header; and
determining the identifier of the first field according to the type of the first packet header, further according to a format of the first packet, and further according to the first offset, and the first length.

7. The method according to claim 3, wherein the receiving device is a conversion device and wherein the method further comprises:
generating, by the conversion device, a second operation request according to the identifier of the first field and the first assignment content; and
sending the second operation request to a data processing device, wherein the second operation request requests the data processing device to, after the first packet is received, perform:
determining the first field in the first packet according to the identifier of the first field; and
assigning a value to the first field according to the first assignment content.

8. The method according to claim 3, wherein the receiving device is a data processing device, and wherein the method further comprises:
receiving, by the data processing device, the first packet; and
assigning, by the data processing device, a value to the first field according to the first assignment content and the identifier of the first field.

9. The method according to claim 3, wherein the identifier of the first field is a name of the first field.

10. The method according to claim 3, wherein the first operation request is described in a first description language recognizable to the receiving device.

11. A generation device, comprising:
a processor; and
a non-transitory computer-readable storage medium storing a program to be executed by the processor, the program including instructions for:
generating a first operation request, that requests performance of an operation on a first packet, wherein the first operation request comprises first assignment content and information indicating a first assignment location, wherein the first assignment location is a location in the first packet, wherein the first assignment content is data indicating assignment of a value to the first assignment location, wherein the information indicating the first assignment location comprises an identifier of a type of a first packet header, and further comprises a first offset, and a first length, wherein the first packet header is a packet header in the first packet, and wherein the first offset is an offset relative to a start location of the first packet header; and
sending the first operation request to a description device or a receiving device based on a determination, by the generation device, on whether the receiving device has the capability of recognizing the first operation request that is not described by the description device, wherein the first operation request is a generic operation request independent of a protocol related to a payload of the first packet, and wherein the payload of the first packet is separate from the header of the first packet;
wherein receiving the first operation request by the description device causes the description device to generate a second operation request by performing protocol description on the first operation request using a first description language recognizable to the receiving device, and to send the second operation request to the receiving device.

12. A generation device, comprising:
a processor; and
a non-transitory computer-readable storage medium storing a program to be executed by the processor, the program including instructions for:
generating a first operation request, that requests performance of an operation on a first packet, wherein the first operation request is described in a first description language recognizable to a receiving device; and
sending the first operation request to the receiving device based on a determination, by the generation device, that the receiving device has the capability of recognizing the first operation request that is not described by a description device, wherein the first operation request is a generic operation request independent of a protocol related to a payload of the first packet, and wherein the payload of the first packet is separate from a header of the first packet;
wherein the first operation request comprises first assignment content and information indicating a first assignment location, wherein the first assignment location is a location in the first packet, wherein the first assignment content is data indicating assignment of a value to the first assignment location, wherein the information indicating the first assignment location comprises an identifier of a type of the header of the first packet, and further comprises a first offset, and a first length, wherein the first packet header is a packet header in the first packet, and wherein the first offset is an offset relative to a start location of the first packet header; and
wherein the sending the first operation request to the receiving device causes the receiving device to determine, according to the information indicating the first assignment location, an identifier of a first field corresponding to the first assignment location, wherein the first field is a field in the first packet.

13. The generation device according to claim 12, wherein the receiving device is a conversion device or a data processing device.

14. The generation device according to claim 12, wherein causing the receiving device to determine the identifier of the first field corresponding to the first assignment location comprises causing the receiving device to perform at least one of:
perform a first process comprising
determining the type of the first packet header according to the identifier of the type of the first packet header; and
determining the identifier of the first field according to a format of the first packet header, and further according to the first offset, and the first length, wherein the first field is a field in the first packet header, and wherein the format of the first packet header is determined according to the type of the first packet header; or
perform a second process comprising:
determining the type of the first packet header according to the identifier of the type of the first packet header; and
determining the identifier of the first field according to the type of the first packet header, further according to a format of the first packet, and further according to the first offset, and the first length.

15. The generation device according to claim 12, wherein the identifier of the first field is a name of the first field.

16. A description device, comprising:
a processor; and
a non-transitory computer-readable storage medium storing a program to be executed by the processor, the program including instructions to:
receive a first operation request, from a generation device, that requests performance of an operation on a first packet, wherein the first operation request comprises first assignment content and information indicating a first assignment location, wherein the first assignment location is a location in the first packet, wherein the first assignment content is data indicates assignment of a value to the first assignment location, wherein the information indicating the first assignment location comprises an identifier of a type of a first packet header, and further comprises a first offset, and a first length, wherein the first packet header is a packet header in the first packet, and wherein the first offset is an offset relative to a start location of the first packet header, wherein the first operation request is a generic operation request independent of a protocol related to a payload of the first packet, and wherein the payload of the first packet is separate from the header of the first packet;
generate a second operation request by performing protocol description on the first operation request using a first description language recognizable to a receiving device based on a determination, by the generation device, that the receiving device does not have the capability of recognizing the first operation request that is not described by the description device; and send the second operation request to the receiving device, wherein receiving the first operation request by the description device causes the description device to generate a second operation request by performing protocol description on the first operation request using a first description language recognizable to the receiving device, and to send the second operation request to the receiving device.

17. The description device according to claim 16, wherein the receiving device is a conversion device or a data processing device.

\* \* \* \* \*